LIGHT COLLECTOR FOR PHOTOSENSITIVE ELEMENT

Original Filed Dec. 28, 1948

Inventors
George W. Onksen, Jr.,
Charles W. Miller, &
Robert N. Falge
By S. E. Ross
Attorney

LIGHT COLLECTOR FOR PHOTOSENSITIVE ELEMENT

Original Filed Dec. 28, 1948

3 Sheets-Sheet 2

Inventors
George W. Onksen, Jr.,
Charles W. Miller, &
Robert K. Falge

By

S. E. Ross
Attorneys

Inventors
George W. Onksen, Jr.,
Charles W. Miller, &
Robert N. Falge
By S. C. Ross
Attorneys

United States Patent Office 2,762,930

Patented Sept. 11, 1956

2,762,930

LIGHT COLLECTOR FOR PHOTOSENSITIVE ELEMENT

George W. Onksen, Jr., Charles W. Miller, and Robert N. Falge, Anderson, Ind., assignors to General Motors Corporation, Detroit, Mich., a corporation of Delaware Application April 29, 1954, Serial No. 426,517

11 Claims. (Cl. 250—215)

This is a continuation of my co-pending application Serial No. 67,722 filed December 28, 1948, now abandoned.

The present invention relates to light-responsive devices and more particularly to an improved light collector for photoelectric cells.

Automotive vehicle illuminating systems provided with means responsive to the light of an oncoming vehicle for automatically controlling the energization and deenergization of the high and low beam filaments of the headlamps have not been entirely satisfactory because of the lack of suitable means for selectively distinguishing between the headlights of an oncoming vehicle and such other highway conditions as the back reflection of light off the highway surface due to the vehicle's own headlights and light sources of varying intensities usually found adjacent country highways. To be satisfactory it is considered that such a system should be adapted to selectively distinguish between the aforementioned lighting conditions and in addition be responsive to city lighting conditions to effect an automatic dimming of the vehicle headlights for city driving.

Accordingly it is an object of the present invention to provide in a light-responsive automatically controlled illuminating system an improved means to selectively distinguish optimum lighting conditions for the actuation of the illuminating system.

Another object is to provide an improved light collecting device for photoelectric cells in the light-responsive automatically controlled vehicle illuminating systems which will protect the cell from exposure to substantially all highway lighting conditions other than those desired to effect a dimming of the vehicle headlights.

These and other objects are attained in accordance with the present invention by providing an improved photoelectric cell enclosing structure having an optical system comprising a condensing lens and an aperture for transmitting light to the light-responsive element of the photoelectric cell.

Further objects and advantages of the invention will become apparent as the following description proceeds and the features of novelty which characterize the invention will be pointed out with particularity in the claims annexed to and forming a part of this specification.

For a better understanding of the invention reference may be had to the accompanying drawings in which.

Figure 1:
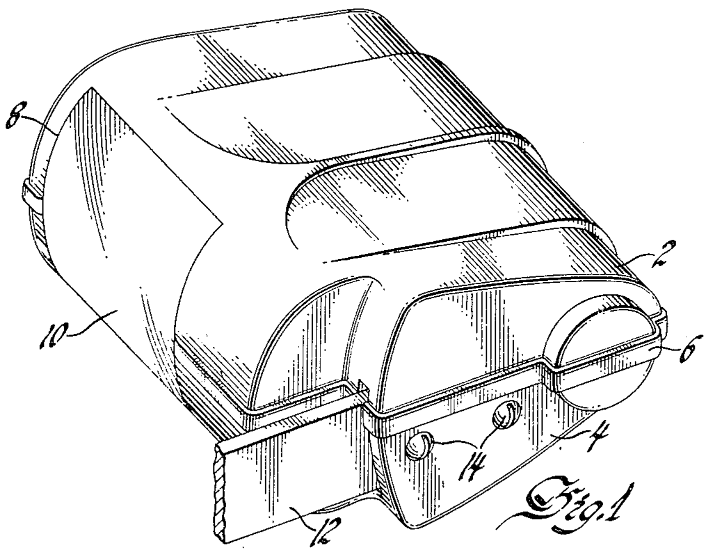
Figure 1 is a perspective view of a photoelectric cell enclosure embodying the present invention.
Figure 2:
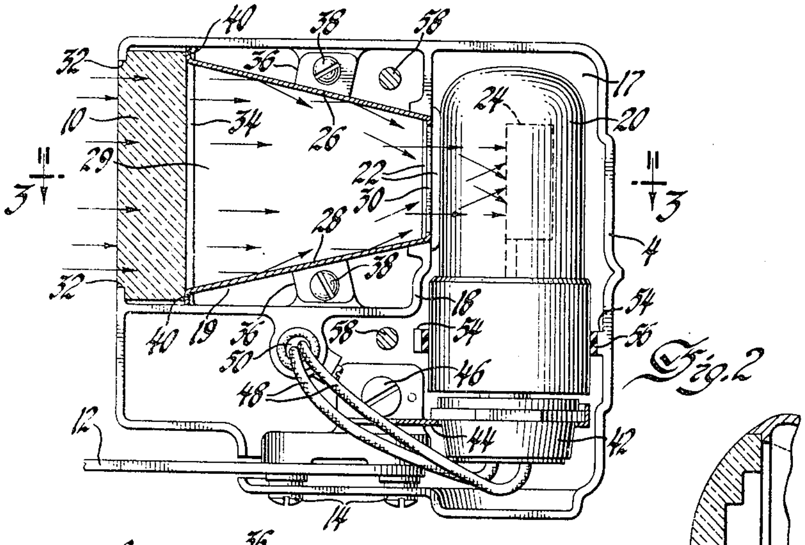
Figure 2 is a plan view in section of the enclosure with a photoelectric cell illustrated therein.
Figure 3:
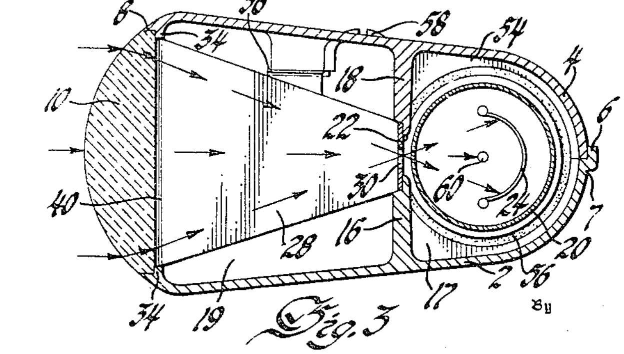
Figure 3 is a view taken along the line 3—3 of Figure 2.
Figure 15:
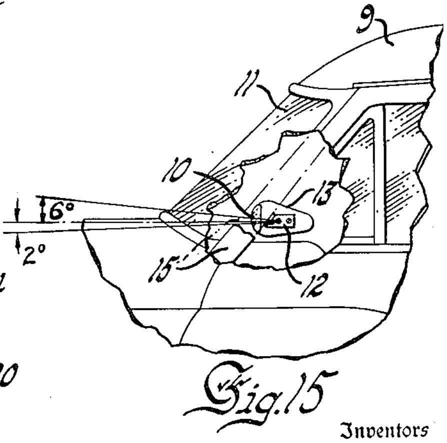
Figure 15 is a view showing the collecting device mounted in position behind the windshield of a vehicle.

Referring now the the drawings and particularly to Figures 1, 2 and 3, there is illustrated an enclosing housing for photoelectric cells adapted to provide energization of the light-responsive element of the cell under predetermined extraneous lighting conditions. The cell housing comprises upper and lower complementary housings 2 and 4 respectively, with the upper enclosing member 2 being formed with a flared band 6 adjacent its edges providing a seating shoulder 7, see Figure 3, for engaging the edges of the lower enclosing member 4. With the upper and lower enclosing members in assembled position a window aperture 8 is provided at one end for receiving a light-transmitting condensing lens 10. Where the housing is to be used with a vehicle illumination system for control of the high and low beam filaments of the headlamp, it may be attached to a suitable part of the vehicle by a bracket 12 which is fastened to the lower enclosing member 4 by suitable fastening members 14. In vehicle applications where the vehicle is operated from the left-hand side and traffic moves in lanes to the right, it is desirable to mount the photoelectric cell housing on the left-hand windshield post of the vehicle behind the windshield so that the longitudinal axis of the cell or tube is substantially parallel to the transverse axis of the vehicle and the optical axis of the lens is substantially parallel to the longitudinal axis of the vehicle. This is shown in Fig. 15 wherein 9 is a vehicle having windshield 11, the light gathering unit 13 being secured to windshield post 15 by means of the bracket 12 so that the condensing lens 10 faces or "looks through" the windshield. In this position the photoelectric cell housing is more susceptible to exposure to the lights of an oncoming vehicle. In this connection we have found that the most satisfactory position for the housing is behind the lower left-hand corner of the windshield. To provide for limited angular adjustment of the housing on its bracket 12, the bracket may be provided with at least one aperture having an oblong arcuate configuration concentric to the other bracket aperture.

The upper and lower enclosing members 2 and 4 are provided with complementary partitions 16 and 18 respectively, which cooperate to divide the assembled housing into two compartments 17 and 19, the first for receiving and positioning a photoelectric cell 20 and the latter for transmitting light to the cell. A window 22 formed by the complementary partition members 16 and 18 is provided for communication between the two compartments 17 and 19.

An optical system for directing light onto the cathode 24 of the cell 20 is provided in the light-transmitting compartment 19 and comprises the lens 10, side reflector panels 26 and 28 and a rectangular aperture 30. In Figures 2 and 3 the lens 10 is illustrated as a plano-convex cylindrical lens provided with recessed shoulders 32 adjacent its ends for positioning the lens in the aperture 8 with the plane surface of the lens facing the light-transmitting compartment. Flanges 34 are formed in the upper and lower enclosing members 2 and 4 to provide an abutting flange for the side edges of the lens. The reflector panels 26 and 28 and the rectangular aperture 30 are formed preferably in a metal stamping formed to the configuration shown. The panels are provided with ears 36 for attaching the stamping to the lower enclosing member 4 by fastening members 38. To provide additional abutting stops for supporting the lens in aperture 8, the reflector ends 40 of the metal stamping are outturned and the formed stamping is positioned with the outturned ends adjacent the ends of the lens 10.

The photoelectric cell 20 is mounted in the cell compartment 17 of the assembled housing by means of a socket 42 which is held by a bracket 44 attached to the lower enclosing member 4 by fastening member 46. Conductor wires 48 are brought into the housing for connection with the terminals of the socket 42 through an aperture 50 in the lower enclosing member 4. To hold the photoelectric cell 20 securely in its compartment 17, complementary supports 54 having semi-circular supporting surfaces are formed in the upper and lower enclosing members 2 and 4 for cooperation with a band 56 of shock insulating material surrounding the base of the cell. Bolt holes 58 are provided in the lower enclosing cell for securing the upper and lower enclosing members in assembled relationship.

With an enclosing housing having an optical system such as that shown and described, it is considered desirable that the system transmit light emanating from the headlamps of an oncoming vehicle to the light-responsive cathode of the tube 20 and exclude the transmission of light emanating from a source below the longitudinal axis of the vehicle such as the back reflected light of the vehicle's own headlights. Further, it is considered desirable that the system be adapted to exclude the transmission of light emanating from high intensity overhanging highway light sources immediately ahead of the vehicle. To accomplish these desirable results the coinciding axes of the anode 60 and the cathode 24 are aligned on the focal axis of lens 10 with aperture 30 spaced between the tube 20 and lens 10 at the foci of the lens. In this connection we have found that optimum results are obtained by positioning the aperture 30 with its longitudinal centerline parallel with and below the line focus of the lens. The width of the aperture 30 is predetermined to provide a vertical angular spread for light reception to the cell of substantially eight degrees within which extraneous light will be transmitted to the cathode of tube 20. Further by offsetting the longitudinal centerline of the aperture 30 below the line focus of the lens as shown in Figure 3, provision is made for the transmission of light to the cathode emanating from an extraneous source within a vertical angle of substantially two degrees below the focal axis of the lens and six degrees above (see Figure 15). As shown in the drawings, the length of aperture 30 is made to correspond with the length of the cathode to permit transmission of light to the cathode throughout its entire length. The length of aperture 30, however, along with the length of aperture 8 will determine the horizontal angle within which rays from a light source outside of the housing and within this angle will be transmitted to the cathode. We have found that this angle may be as large as forty degrees and as small as fifteen degrees for suitable operation in a light-responsive automatically controlled vehicle headlighting system. However, for the most desirable results it is preferred that the angle be about twenty-four degrees. With the cylindrical lens 10 illustrated in Figures 1, 2 and 3 it will be understood that light rays entering the lens near its ends and normal to the front face are reflected by the reflector panels 26 and 28 and directed to the cathode 24 through the aperture 30 thereby improving the efficiency of the light-transmission to the cathode.

Figure 4:
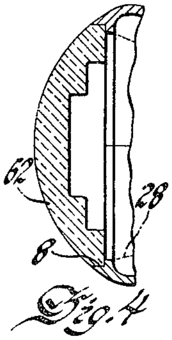
Figures 4 and 5 are fragmentary views in section of the enclosure illustrating lens interchangeable with the lens of Figures 1, 2 and 3.
Figure 5:
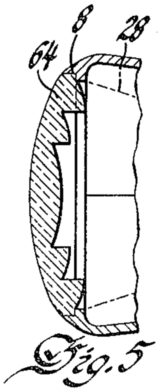

In Figures 4 and 5 respectively, there is illustrated a plano-convex cylindrical lens 62 and a double-convex cylindrical lens 64 positioned in the aperture 8 of the photoelectric cell housing. In both lenses the inner lens surface is stepped to reduce the lens section. Both of these lenses would be suitable as substitute lenses in the optical system described in connection with Figures 1, 2 and 3 and would provide substantially the same optical characteristics in the system.

Figure 6:
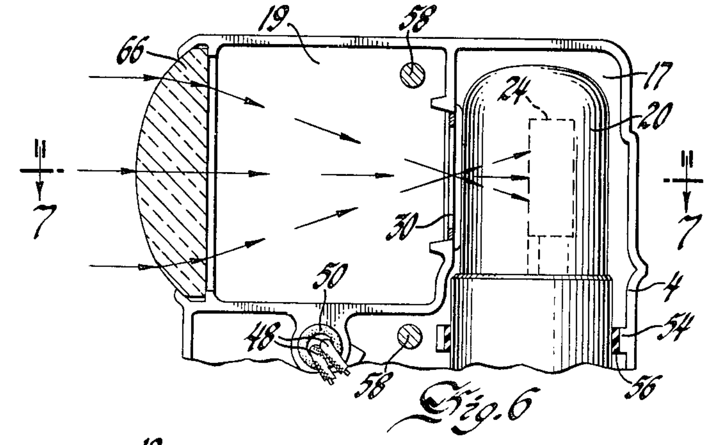
Figure 6 is a plan view in section and partly broken away of a modification of the present invention.
Figure 7:
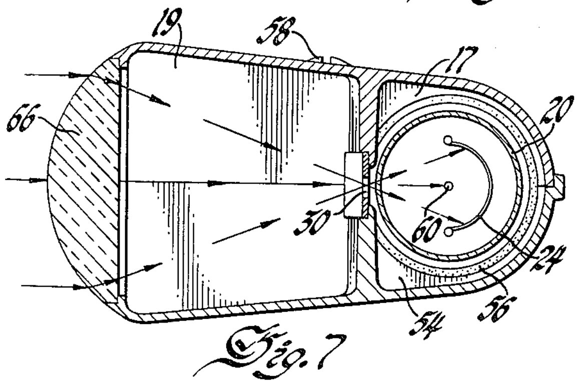
Figure 7 is a view taken along the line 7—7 of Figure 6.

Figures 6 and 7 of the drawings illustrate a modification of the present invention in which the reflector panels 26 and 28 and the lens 10 of Figures 2 and 3 are replaced by a plano-convex spherical lens 66. In this modification the lens 66 will form a point focus on the aperture instead of the line focus of the lens 10. This is considered desirable in that the reflector panels 26 and 28 may be entirely eliminated and further that the horizontal angle within which light from an outside source may be transmitted to the cathode is determined by the length of aperture 30.

Figure 8:
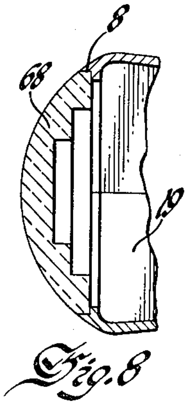
Figures 8 and 9 are fragmentary views in section of the enclosure of Figures 6 and 7 illustrating lens interchangeable with the lens of this modification.
Figure 9:
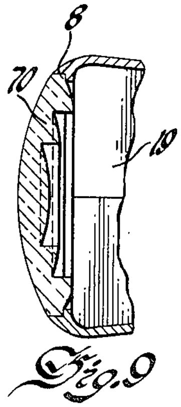

Figures 8 and 9 respectively illustrate a plano-convex spherical lens 68 and a double-convex spherical lens 70 positioned in the aperture 8 of the cell housing. In both of these lenses the inner surface is also stepped to reduce the lens section. Both of these lenses would be suitable as substitute lenses in the optical system shown and described in connection with Figures 6 and 7.

Figure 10:
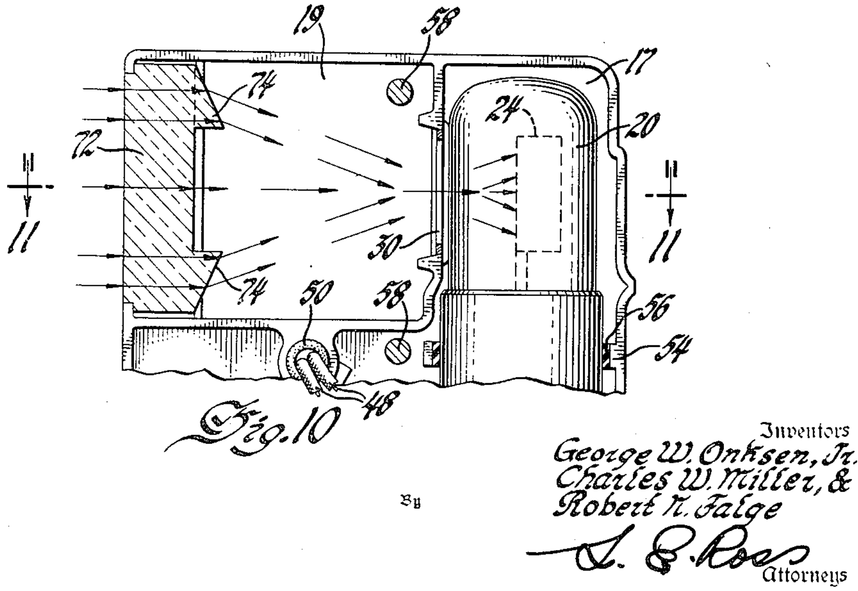
Figure 10 is a plan view in section and partly broken away of another modification of the present invention.
Figure 11:
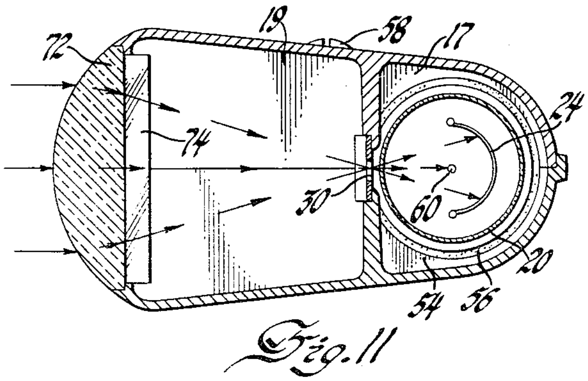
Figure 11 is a view taken along the line 11—11 of Figure 10.

In Figures 10 and 11 there is illustrated another modification in which a plano-convex cylindrical lens 72 is provided with prisms 74 superimposed on the plane surface. In this modification the prisms are provided to redirect light entering the end of the lens thereby eliminating the need for reflector panels 26 and 28.

Figure 12:
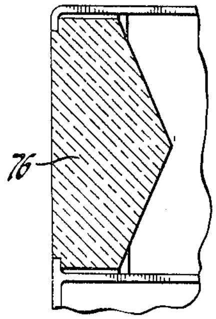
Figure 12 is a fragmentary view in section of the enclosure of Figures 10 and 11 illustrating a lens interchangeable with the lens of the modification of Figures 10 and 11.

Figure 12 illustrates a lens 76 similar to lens 72 of Figures 10 and 11 except that the inner surface of the lens is entirely prismatic.

Figure 13:
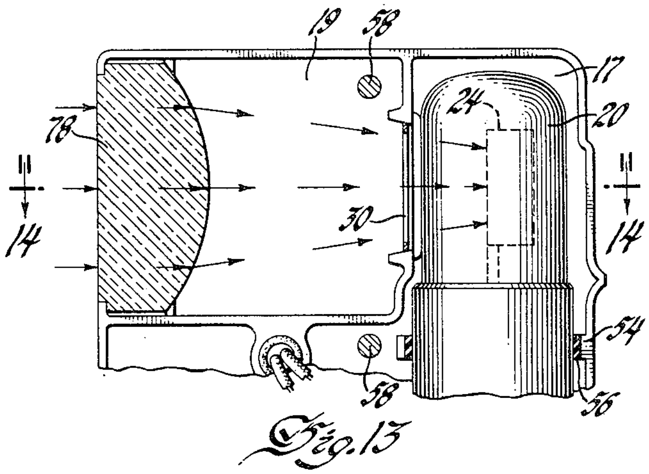
Figure 13 is a plan view in section and partly broken away of still another modification of the present invention.
Figure 14:
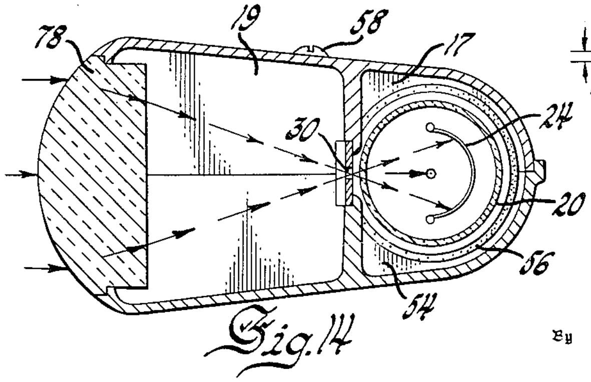
Figure 14 is a view taken along the line 14—14 of Figure 13.

In Figures 13 and 14 there is illustrated still another modification of the present invention in which the lens 78 is a double cylindrical lens with the axes of the cylindrical surfaces angularly disposed by 90 degrees. As will be seen from the illustrations in Figures 13 and 14 light rays parallel with the axis of the front surface of the lens and entering the lens above or below the axis will be focused on the aperture 30 while light rays parallel with the focal axis of the rear surface of the lens and entering the lens to the right or left of the axis will be focused on a point on or behind the cathode 24 thus making reflector panels 26 and 28 unnecessary.

In connection with the descriptions of the various modifications it will be understood that each of the modifications is provided with an optical system adapted to accomplish the desirable results described in connection with Figures 1, 2 and 3.

While the embodiment of the present invention as herein disclosed constitutes a preferred form, it is to be understood that other forms might be adopted, all coming within the scope of the claims which follow.

What we claim as new and desire to obtain by Letters Patent of the United States is:

1. A light collector for a vehicle headlamp dimming device comprising a housing having an opening therein, adjustable mounting means on said housing adapted to cooperate with said vehicle for adjustably securing said collector on said vehicle so that said opening faces toward the front of the vehicle for the reception of light, a photosensitive element in said housing facing said opening and means for directing light from sources in front of the vehicle on which said collector is mounted to said photosensitive element, said last-named means comprising a light condensing lens in said opening and an opaque partition having a horizontally disposed elongated aperture therein positioned in said housing between said opening and said photosensitive element and dividing said housing into two compartments, said aperture being located substantially at the focal plane of said lens in alignment with said lens and said photosensitive element and providing the sole means for admitting light to said photosensitive element from said opening.

2. A light collector for a vehicle headlamp dimming device as recited in claim 1 and in which the longitudinal axis of the aperture is positioned below the focal axis of the lens.

3. A light collector for a vehicle headlamp dimming device as recited in claim 1 and in which the lens is a cylindrical condensing lens.

4. A light collector for a vehicle headlamp dimming device as recited in claim 1 and in which the lens is a stepped spherical condensing lens.

5. A light collector for a vehicle headlamp dimming device as recited in claim 1 and in which the lens has a cylindrical surface on one side thereof and a prismatic surface on the oppositely disposed side thereof.

6. A light collector for a vehicle headlamp dimming device as recited in claim 1 and in which the lens has oppositely disposed cylindrical surfaces disposed at a 90° angle with respect to each other.

7. A light collector for a vehicle headlamp dimming device comprising a housing having an opening therein, adjustable mounting means on said housing adapted to cooperate with said vehicle for adjustably securing said collector on said vehicle so that said opening faces toward the front of the vehicle for the reception of light, a photosensitive element in said housing facing said opening and means for directing light from sources in front of the vehicle on which said collector is mounted to said photosensitive element, said last-mentioned means comprising a spherical light condensing lens in said opening and an opaque partition having a horizontally disposed elongated aperture therein positioned in said housing between and spaced from said opening and said photosensitive element and dividing said housing into two compartments, said aperture being located substantially at the focal plane of said lens in alignment with said lens and said photosensitive element and providing the sole means for admitting light to said photosensitive element from said opening.

8. In an automotive vehicle having a windshield, a light collector for a headlamp dimming device comprising a housing having an opening therein, adjustable mounting means on said housing securing said collector on said vehicle behind the windshield thereof so that said opening faces said windshield for the reception of light therethrough, a photosensitive element in said housing facing said opening and means for directing light from said opening to said photosensitive element, said last-mentioned means comprising a light condensing lens in said opening and an opaque partition having a horizontally disposed elongated aperture therein positioned in said housing between said opening and said photosensitive element and dividing said housing into two compartments, said aperture being located substantially at the focal plane of said lens in alignment with said lens and said photosensitive element and providing the sole means for admitting light to said photosensitive element from said opening.

9. In an automotive vehicle, a light collector for a headlamp dimming device comprising a housing having an opening therein, a photosensitive element in said housing facing said opening, means for directing light from said opening to said photosensitive element, said means comprising a spherical light condensing lens in said opening, an opaque partition having a horizontally disposed elongated aperture therein positioned in said housing between said opening and said photosensitive element and dividing said housing into two compartments, said aperture being located substantially at the focal plane of said lens in alignment with said lens and said photosensitive element and providing the sole means for admitting light to said photosensitive element from said opening, and an adjustable support on said housing securing said light collector on said vehicle so that said aperture is positioned to admit to said photosensitive element only that light approaching said vehicle from within predetermined horizontal angles to the left and right of the focal axis of said lens and from within predetermined vertical angles above and below the focal axis of said lens, the predetermined vertical angle below said focal axis being smaller than the predetermined angle above said focal axis.

10. A light collector for a vehicle headlamp dimming device comprising a housing having an opening therein, adjustable mounting means on said housing adapted to cooperate with said vehicle for adjustably securing said collector on said vehicle so that said opening faces toward the front of the vehicle for the reception of light, a horizontally disposed elongated photosensitive element in said housing facing said opening and means for directing light from sources in front of the vehicle on which said collector is mounted to said photosensitive element, said last-mentioned means comprising a spherical light condensing lens in said opening and an opaque partition having a horizontally disposed elongated aperture therein positioned in said housing between said opening and said photosensitive element and dividing said housing into two compartments, said aperture being located substantially at the focal plane of said lens in alignment with said lens and said photosensitive element and providing the sole means for admitting light to said photosensitive element from said opening.

11. A light collector for a vehicle headlamp dimming device comprising a housing having an opening therein, adjustable mounting means on said housing adapted to cooperate with said vehicle for adjustably securing said collector on said vehicle so that said opening faces toward the front of the vehicle for the reception of light, a photosensitive element in said housing facing said opening and means for directing light from sources in front of the vehicle on which said collector is mounted to said photosensitive element, said last-mentioned means comprising a cylindrical light condensing lens in said opening, an opaque partition having a horizontally disposed elongated aperture therein positioned in said housing between said opening and said photosensitive element and dividing said housing into two compartments, said aperture being located substantially at the focal plane of said lens in alignment with said lens and said photosensitive element and providing the sole means for admitting light to said photosensitive element from said opening, and a pair of reflectors angularly disposed on opposite sides of said aperture and between said aperture and said lens.

References Cited in the file of this patent

UNITED STATES PATENTS

| | | |
|---|---|---|
| 801,766 | Churchill | Oct. 10, 1905 |
| 1,935,698 | Decker et al. | Nov. 21, 1933 |
| 2,013,594 | Zworykin | Sept. 3, 1935 |
| 2,182,987 | Hopkins | Dec. 12, 1939 |
| 2,207,097 | Logan | July 9, 1940 |
| 2,208,016 | Cowles | July 16, 1940 |
| 2,375,677 | Moore | May 8, 1945 |
| 2,413,208 | Barnes | Dec. 24, 1946 |
| 2,442,240 | Hooker et al. | May 25, 1948 |